United States Patent
Kang et al.

(10) Patent No.: US 11,637,700 B2
(45) Date of Patent: Apr. 25, 2023

(54) METHOD AND APPARATUS WITH ENCRYPTION BASED ON ERROR VARIANCE IN HOMOMORPHIC ENCRYPTION

(71) Applicants: SAMSUNG ELECTRONICS CO., LTD., Suwon-si (KR); SNU R&DB FOUNDATION, Seoul (KR); Industry Academic Cooperation Foundation Chosun University, Gwangju (KR)

(72) Inventors: Hyungchul Kang, Seoul (KR); Yongwoo Lee, Seoul (KR); Young-Sik Kim, Gwangju (KR); Jong-Seon No, Seoul (KR); Joon-woo Lee, Seoul (KR)

(73) Assignees: SAMSUNG ELECTRONICS CO., LTD., Suwon-si (KR); SNU R&DB FOUNDATION, Seoul (KR); Industry Academic Cooperation Foundation Chosun University, Gwangju (KR)

( * ) Notice: Subject to any disclaimer, the term of this patent is extended or adjusted under 35 U.S.C. 154(b) by 0 days.

(21) Appl. No.: 17/392,651

(22) Filed: Aug. 3, 2021

(65) Prior Publication Data
US 2022/0052848 A1 Feb. 17, 2022

(30) Foreign Application Priority Data

Aug. 14, 2020 (KR) .......................... 10-2020-0102633
May 28, 2021 (KR) .......................... 10-2021-0068981

(51) Int. Cl.
*H04L 9/30* (2006.01)
*H04L 9/00* (2022.01)
*G06F 17/17* (2006.01)

(52) U.S. Cl.
CPC ............ *H04L 9/3026* (2013.01); *G06F 17/17* (2013.01); *H04L 9/008* (2013.01)

(58) Field of Classification Search
CPC ........ H04L 9/3026; H04L 9/008; G06F 17/17
See application file for complete search history.

(56) References Cited

U.S. PATENT DOCUMENTS

| 9,246,675 B2 | 1/2016 | Ding |
| 2014/0177828 A1* | 6/2014 | Loftus ................... H04L 9/0852 380/44 |

(Continued)

FOREIGN PATENT DOCUMENTS

| CN | 111478765 A | 7/2020 |
| KR | 10-1600016 B1 | 3/2016 |

(Continued)

OTHER PUBLICATIONS

Bootstrap Current Optimization in Tokamaks Using Sum-of-Squares Polynomials, by Alamir et al., published Oct. 2012 (Year: 2012).*

(Continued)

*Primary Examiner* — Vu V Tran
(74) *Attorney, Agent, or Firm* — NSIP Law

(57) ABSTRACT

A processor-implemented encryption method using homomorphic encryption includes: receiving data; generating a ciphertext by encrypting the received data; determining a coefficient of an approximating polynomial for performing a modular reduction on a modulus corresponding to the ciphertext, based on an error between the approximating polynomial and a modular reduction function; and performing bootstrapping on the ciphertext by performing the modular reduction based on the determined coefficient of the approximating polynomial.

18 Claims, 4 Drawing Sheets

(56) References Cited

U.S. PATENT DOCUMENTS

2019/0334694 A1* 10/2019 Chen ........................ H04L 9/008
2020/0228307 A1* 7/2020 Cheon ................... H04L 9/3093
2022/0029782 A1* 1/2022 Cheon ..................... H04L 9/008

FOREIGN PATENT DOCUMENTS

| KR | 10-1608515 B1 | 4/2016 |
| --- | --- | --- |
| KR | 10-1618941 B1 | 5/2016 |
| KR | 10-1861089 B1 | 5/2018 |
| KR | 10-1919940 B1 | 11/2018 |
| KR | 10-1965628 B1 | 4/2019 |
| KR | 10-1971215 B1 | 4/2019 |
| KR | 10-2040106 B1 | 11/2019 |
| KR | 10-2040120 B1 | 11/2019 |
| KR | 10-2020-0087061 A | 7/2020 |
| KR | 10-2020-0087708 A | 7/2020 |
| WO | WO 2020/022598 A1 | 1/2020 |

OTHER PUBLICATIONS

Han, et al. "Better Bootstrapping for Approximate Homomorphic Encryption." *Cryptographers' Track at the PSA Conference.* Springer, Cham, 2020. (26 pages in English).

Lee, et al. "High-Precision and Low-Complexity Approximate Homomorphic Encryption by Error Variance Minimization." *IACP Cryptol. ePrint Arch* 1549 (2020). (38 pages in English).

* cited by examiner

| Algorithm |
|---|
| Instance: A ciphertext c of t, the BSGS coeffcients $d = (d_{0,1}, d_{0,3}, \ldots, d_{2^l-1,k-1})$.
Output: A ciphertext encrypting $p(t)$.
1: Let $l$ be the smallest integer satisfying $2^l k > n$ for an even number $k$.
2: procedure SETUP(c, l, k)         ▷ Do not rescale or relinearize $c_i$'s if unnecessary.
3:     $c_{cheb_i} \leftarrow$ encryption of $T_i(t)$ ▷ only for all odd $i < k$ and $i$'s to find such $c_i$'s.
4:     $c_{cheb 2^i k} \leftarrow$ encryption of $T_{2^i k}(t)$                       ▷ for $0 \le i < l$.
5: end procedure
6: procedure BABYSTEP(b, $c_i$'s, l, k)                       ▷ No rescaling here
7:     $c_{poly_i}^0 \leftarrow \sum_{j \in \{1,3,\ldots,k-1\}} d_{i,j} c_{chebj}(t)$             ▷ baby polynomials.
8: end procedure
9: procedure GIANTSTEP($p_i^0$'s, l, k)
10:     $c_{poly_i}^{j+1} \leftarrow c_{poly_{2i}}^{j} + c_{poly_{2i+1}}^{j} \cdot c_2^{j_k}$
        ▷ $c_{poly_{2i}}^{j}$: not linearized, rescaled / $c_2^{j_k}, c_{poly_{2i+1}}^{j}$: linearized, rescaled for mult.
11:     Recursively, calculate $c_{poly_0}^l$
12:     return $c_{poly_0}^l$
13: end procedure |

FIG. 3

METHOD AND APPARATUS WITH ENCRYPTION BASED ON ERROR VARIANCE IN HOMOMORPHIC ENCRYPTION

CROSS-REFERENCE TO RELATED APPLICATIONS

This application claims the benefit under 35 USC § 119(a) of Korean Patent Application No. 10-2020-0102633 filed on Aug. 14, 2020, and Korean Patent Application No. 10-2021-0068981 filed on May 28, 2021, in the Korean Intellectual Property Office, the entire disclosures of which are incorporated herein by reference for all purposes.

BACKGROUND

1. Field

The following description relates to a method and apparatus with encryption based on error variance in homomorphic encryption.

2. Description of Related Art

Fully homomorphic encryption (FHE) may refer to an encryption method that enables a logical or mathematical operation using encrypted data. FHE may be used to maintain security in data processing.

However, a typical encryption method may not readily process encrypted data and may not effectively protect the privacy of clients.

FHE may enable clients to receive services while protecting their privacy.

The typical encryption method may have issues of an increasing error and a great influence of an error variance because, as the degree of approximating polynomial increases, the magnitude of a coefficient increases, when approximating a modular reduction function of bootstrapping.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented encryption method using homomorphic encryption includes: receiving data; generating a ciphertext by encrypting the received data; determining a coefficient of an approximating polynomial for performing a modular reduction on a modulus corresponding to the ciphertext, based on an error between the approximating polynomial and a modular reduction function; and performing bootstrapping on the ciphertext by performing the modular reduction based on the determined coefficient of the approximating polynomial.

The determining of the coefficient of the approximating polynomial may include: calculating the error between the approximating polynomial and the modular reduction function; and determining the coefficient of the approximating polynomial based on a variance of the error.

The determining of the coefficient of the approximating polynomial based on the variance of the error may include: determining, to be the coefficient of the approximating polynomial, a coefficient determined when the variance of the error is less than a target variance.

The determining of the coefficient of the approximating polynomial may include: determining the coefficient of the approximating polynomial based on the variance, a coefficient that is based on a degree of the approximating polynomial, and a weight-constant vector corresponding to the coefficient.

The determining of the coefficient of the approximating polynomial based on the variance, the coefficient that is based on the degree of the approximating polynomial, and the weight-constant vector corresponding to the coefficient may include: multiplying the weight-constant vector and a squared L2-norm of the coefficient; and determining, as the coefficient of the approximating polynomial, a coefficient that minimizes a value determined by adding a result of the multiplying and the variance.

A basis of the approximating polynomial may include a basis of a Chebyshev polynomial or a constant multiple of the basis of the Chebyshev polynomial.

The determining of the coefficient of the approximating polynomial further may include: adjusting a weight-constant vector corresponding to a coefficient that is based on a degree of the approximating polynomial based on the variance and a predetermined reference variance.

The adjusting of the weight-constant vector may include: decreasing the weight-constant vector, in response to a difference between the reference variance and the variance being less than the variance; and increasing the weight-constant vector, in response to the difference between the reference variance and the variance being greater than or equal to the variance.

The determining of the coefficient of the approximating polynomial based on the variance of the error may include: calculating the variance of the error based on a probability distribution corresponding to the ciphertext.

In another general aspect, one or more embodiments include a non-transitory computer-readable storage medium storing instructions that, when executed by a processor, configure the processor to perform any one, any combination, or all operations and methods described herein.

In another general aspect, an encryption apparatus using homomorphic encryption includes: a receiver configured to receive data; and a processor configured to: generate a ciphertext by encrypting the received data; determine a coefficient of an approximating polynomial for performing a modular reduction on a modulus corresponding to the ciphertext, based on an error between the approximating polynomial and a modular reduction function; and perform bootstrapping on the ciphertext by performing the modular reduction based on the determined coefficient of the approximating polynomial.

For the determining of the coefficient of the approximating polynomial, the processor may be configured to: calculate the error between the approximating polynomial and the modular reduction function; and determine the coefficient of the approximating polynomial based on a variance of the error.

For the determining of the coefficient of the approximating polynomial, the processor may be configured to: determine, to be the coefficient of the approximating polynomial, a coefficient determined when the variance of the error is less than a target variance.

For the determining of the coefficient of the approximating polynomial, the processor may be configured to: determine the coefficient of the approximating polynomial based on the variance, a coefficient that is based on a degree of the approximating polynomial, and a weight-constant vector corresponding to the coefficient.

For the determining of the coefficient of the approximating polynomial, the processor may be configured to: multiply the weight-constant vector and a squared L2-norm of the coefficient; and determine, as the coefficient of the approximating polynomial, a coefficient that minimizes a value determined by adding a result of the multiplying and the variance.

A basis of the approximating polynomial may include a basis of a Chebyshev polynomial or a constant multiple of the basis of the Chebyshev polynomial.

For the determining of the coefficient of the approximating polynomial, the processor may be configured to: adjust a weight-constant vector corresponding to a coefficient that is based on a degree of the approximating polynomial, based on the variance and a predetermined reference variance.

For the adjusting of the weight-constant vector, the processor may be configured to: decrease the weight-constant vector, in response to a difference between the reference variance and the variance being less than the variance; and increase the weight-constant vector, in response to the difference being greater than or equal to the variance.

For the determining of the coefficient of the approximating polynomial, the processor may be configured to: calculate the variance of the error based on a probability distribution corresponding to the ciphertext.

In another general aspect, a processor-implemented encryption method using homomorphic encryption includes: generating a ciphertext by encrypting data; determining, as a coefficient of an approximating polynomial, a coefficient that minimizes a value determined based on a variance of an error between the approximating polynomial and a modular reduction function; and performing bootstrapping on the ciphertext by performing a modular reduction on a modulus corresponding to the ciphertext, based on the determined coefficient.

The determining of the coefficient may include adjusting a weight-constant vector corresponding to the coefficient, in response to a difference between a reference variance and a value determined based on the variance of the error being greater than or equal to a stop criterion.

The reference variance may be experimentally obtained by performing bootstrapping.

The determined value may be determined based on the variance, a weight-constant vector corresponding to the coefficient, and a squared L2-norm of the coefficient.

Other features and aspects will be apparent from the following detailed description, the drawings, and the claims.

BRIEF DESCRIPTION OF THE DRAWINGS

FIG. 3 illustrates an example of an algorithm for calculating an approximating polynomial.

Figure 1:
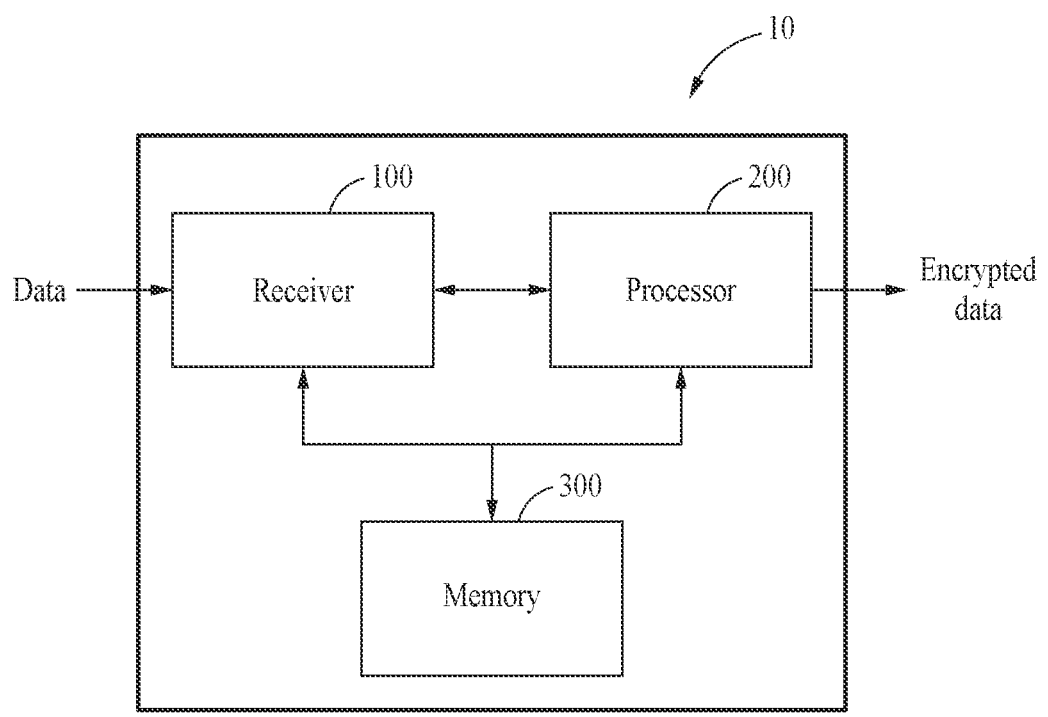
FIG. 1 illustrates an example of an encryption apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of an encryption apparatus.

Referring to FIG. 1, an encryption apparatus 10 may encrypt data. The encryption apparatus 10 may generate encrypted data by encrypting the data. The encrypted data may also be referred to herein as a ciphertext.

The encryption apparatus 10 may provide or implement an encryption method using homomorphic encryption that enables the encrypted data to be computed without decryption. For example, the encryption apparatus 10 may decrypt a result of computing data in an encrypted state using homomorphic encryption, and thus obtain the same result as a result that may be obtained by computing data in a plaintext or unencrypted state. The encryption apparatus 10 may provide or perform a homomorphic encryption operation on a real number or a complex number.

The encryption apparatus 10 may perform bootstrapping that is performed for homomorphic encryption. The encryption apparatus 10 may generate a target approximating polynomial to approximate a function corresponding to a modular reduction that is used for homomorphic encryption.

The encryption apparatus 10 may include a receiver 100 and a processor 200 (e.g., one or more processors). The encryption apparatus 10 may further include a memory 300 (e.g., one or more memories).

The receiver 100 may include a receiving interface. The receiver 100 may receive data. The receiver 100 may receive a plaintext or ciphertext. The ciphertext may have a corresponding modulus. The receiver 100 may output the received plaintext or ciphertext to the processor 200.

The processor 200 may process data stored in the memory 300. The processor 200 may execute computer-readable code, for example, software, stored in the memory 300 and instructions induced by the processor 200.

The processor 200 may be a hardware-implemented data processing device having a physically structured circuit to execute desired operations. For example, the desired operations may be implemented by the execution of code or instructions included in a program.

The hardware-implemented data processing device may include, for example, a microprocessor, a central processing unit (CPU), a processor core, a multi-core processor, a multiprocessor, an application-specific integrated circuit (ASIC), a field-programmable gate array (FPGA), and/or any other device capable of responding to and executing instructions in a defined manner.

The processor 200 may perform encryption using homomorphic encryption. The processor 200 may perform bootstrapping by approximating a function corresponding to a modular reduction. The processor 200 may generate an approximating polynomial that approximates the function corresponding to the modular reduction. A basis of the approximating polynomial may include a basis of a Chebyshev polynomial or a constant multiple of the basis of the Chebyshev polynomial. The basis of the approximating polynomial may include a Legendre polynomial or a power series.

The processor 200 may generate a ciphertext by encrypting data. The processor 200 may obtain a coefficient of an approximating polynomial for performing a modular reduction on a modulus corresponding to the ciphertext based on an error between the approximating polynomial and a function corresponding to the modular reduction. The coefficient of the approximating polynomial may also be referred to herein as an approximating polynomial coefficient, and the function corresponding to the modular reduction may also be referred to herein as a modular reduction coefficient.

The processor 200 may calculate the error between the approximating polynomial and the modular reduction function. The processor 200 may obtain the approximating polynomial coefficient based on a variance of the error.

The processor 200 may determine, to be the approximating polynomial coefficient, a coefficient obtained when the variance of the error is less than a target variance.

The processor 200 may obtain the approximating polynomial coefficient based on the variance, a coefficient that is based on a degree of the approximating polynomial, and a weight-constant vector corresponding to the coefficient. The processor 200 may multiply the weight-constant vector and a squared L2-norm of the coefficient. The processor 200 may obtain, as the approximating polynomial coefficient, a coefficient that minimizes a value obtained by adding a result of the multiplying and the variance.

The processor 200 may adjust the weight-constant vector corresponding to the coefficient that is based on the degree of the approximating polynomial, based on the variance and a predetermined reference variance. When a difference between the reference variance and the variance is less than the variance, the processor 200 may decrease the weight-constant vector. When the difference between the reference variance and the variance is greater than or equal to the variance, the processor 200 may increase the weight-constant vector.

The processor 200 may calculate the variance of the error based on a probability distribution corresponding to the ciphertext. The processor 200 may perform bootstrapping on the ciphertext by performing the modular reduction based on the approximating polynomial coefficient.

The memory 300 may store instructions or a program executable by the processor 200. The instructions may include, for example, instructions for executing an operation of the processor 200 and/or instructions for executing an operation of each component of the processor 200.

The memory 300 may be a volatile or nonvolatile memory device.

The volatile memory device may be, for example, a dynamic random-access memory (DRAM), a static RAM (SRAM), a thyristor RAM (T-RAM), a zero-capacitor RAM (Z-RAM), and/or a twin-transistor RAM (TTRAM).

The nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, and/or an insulator resistance change memory.

Figure 2:
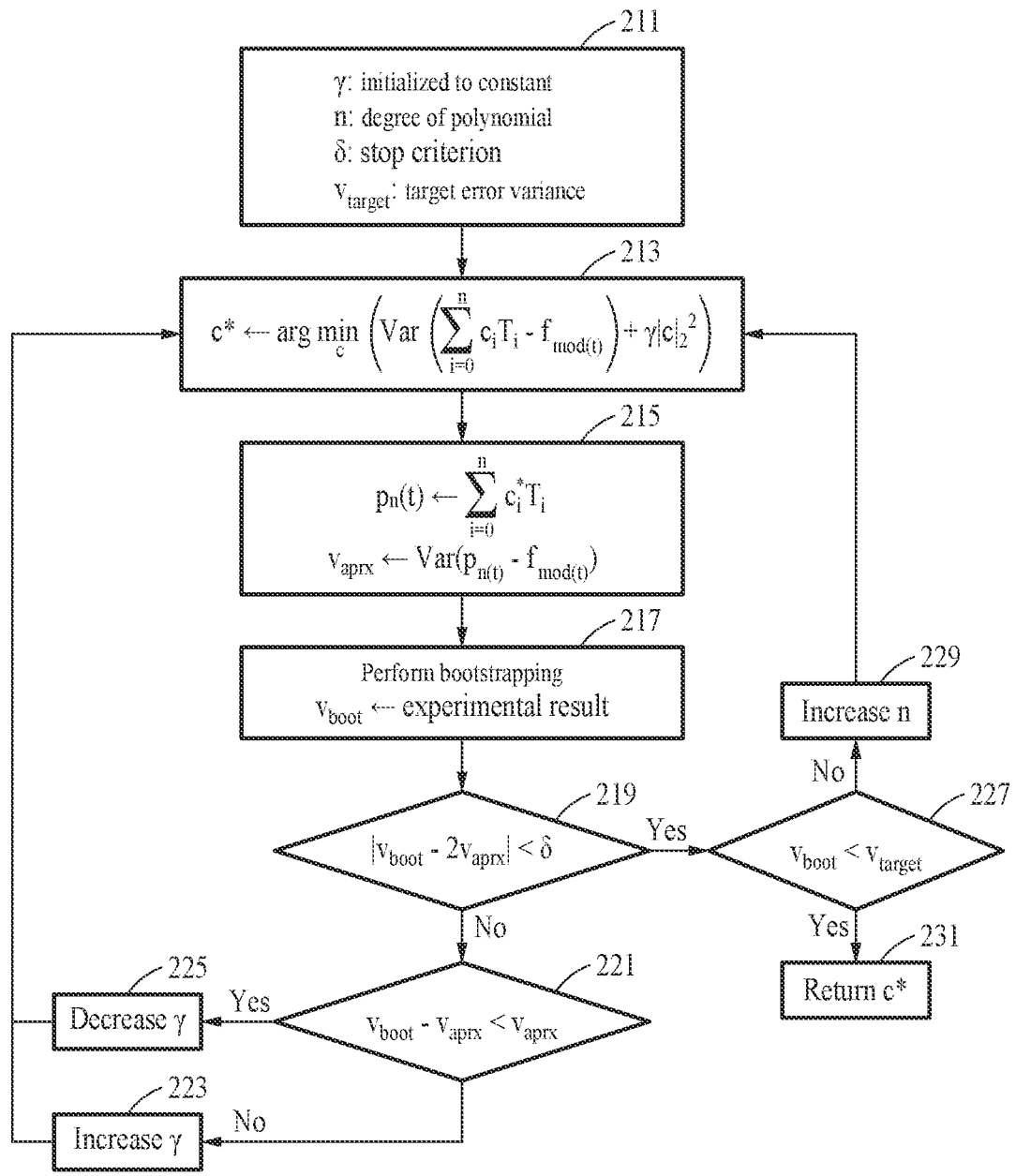
FIG. 2 illustrates an example of obtaining an approximating polynomial coefficient.

FIG. 2 illustrates an example of obtaining an approximating polynomial coefficient.

Referring to FIG. 2, the processor 200 may perform addition and multiplication on a ciphertext using homomorphic encryption. The processor 200 may perform addition and multiplication using a CKKS scheme, for example. The processor 200 may perform addition and multiplication on the ciphertext by calculating a polynomial.

The processor 200 may generate an approximating polynomial that approximates a modular reduction function. The modular reduction function may include a function that is not a polynomial. The processor 200 may obtain the approximating polynomial by obtaining an approximating polynomial coefficient of the approximating polynomial that approximates the modular reduction function.

The processor 200 may obtain an optimal approximating polynomial based on an optimal coefficient of a modular approximating polynomial. The optimal approximating polynomial may refer to a polynomial that minimizes a variance of an error when a distribution of a message (for example, the ciphertext) is given or assumed as a certain distribution.

To solve an issue of an increasing magnitude of a coefficient, the processor 200 of one or more embodiments may search for an optimal value of a total error by providing a tradeoff between the magnitude of the coefficient and a variance of the error.

The processor 200 may sample a plurality of elements in a domain of the modular reduction function which is a target for approximation, collect an image of the elements, and perform an L2-norm optimization or a least square method (LSM) using the collected image. The processor 200 may perform a discrete LSM through sampling or perform a continuous LSM using an inner product of a function.

When a maximum message size increases using the foregoing method, a maximum message size supported by hardware or software that performs a homomorphic encryption operation may change. By decreasing a degree of the approximating polynomial, the encryption apparatus 10 and/or processor 200 of one or more embodiments may reduce the number of times of performing the operation, and thus may reduce the number of times of performing the operation and/or reduce the size of hardware to be used for implementation.

Referring to FIG. 2, in operation 211, the processor 200 may initialize a constant. The processor 200 may initialize a weight-constant vector $\gamma$ to a constant. In the example of FIG. 2, n denotes a degree of a polynomial, $\delta$ denotes a stop criterion, and $V_{target}$ denotes a target variance or a target error variance.

In operation 213, the processor 200 may obtain an approximating polynomial coefficient based on an error between an approximating polynomial for performing a modular reduction on a modulus corresponding to a ciphertext and a modular reduction function.

The processor 200 may calculate the error between the approximating polynomial and the modular reduction function. The processor 200 may obtain the approximating polynomial coefficient based on a variance of the error.

For example, when $\{\phi_0(x), \phi_1(x), \ldots, \phi_n(x)\}$ is a basis of an nth-degree polynomial, the processor 200 may homomorphically calculate the polynomial $f(x)=\Sigma c_i\phi_i(x)$, and represent a result of the calculating with respect to a small error e as $f(x)+e$.

When using a CKKS encryption method, there may be an error in encrypted data, and thus each $\phi_i(x)$ may have an independent $e_{b,i}$ based on rounding and an encryption error, which may be referred to as a basis error.

An output including the polynomial and the error may be represented by Equation 1 below, for example.

$$\Sigma c_i(\phi_i(\chi)+e_{b,i})=f(\chi)+\Sigma c_i e_{b,i}$$

When $e_{b,i}$ has a small value, $\Sigma c_i e_{b,i}$ may be small in general. However, when $|c_i|$ is extremely large compared to $\|f(x)\|\infty$ as in a high-degree polynomial for bootstrapping, $\Sigma c_i e_{b,i}$ may overwhelm f(x).

The processor 200 may control the magnitude of $c_i$ when searching for an approximating polynomial of a function that is not an arbitrary polynomial. In general, a high-degree approximating polynomial may have a large coefficient.

The processor 200 may optimize an approximating polynomial by minimizing a variance of an approximation error. A basis error may be amplified by a coefficient of the approximating polynomial. The magnitude of the coefficient should not have a large value, and thus the processor 200 may obtain an optimal coefficient vector c* using a generalized LSM.

The processor 200 may generate an optimal coefficient vector using Equation 1 above. A polynomial obtained using Equation 1 may be referred to as an error variance-minimizing polynomial, which may have an analytic solution.

The processor 200 may obtain the approximating polynomial coefficient based on the variance, a coefficient that is based on a degree of the approximating polynomial, and a weight-constant vector corresponding to the coefficient. The processor 200 may multiply the weight-constant vector and a squared L2-norm of the coefficient. The processor 200 may obtain, as the approximating polynomial coefficient, a coefficient that minimizes a value obtained by adding a result of the multiplying and the variance.

For example, the processor 200 may obtain the approximating polynomial coefficient based on Equation 2 below, for example.

$$c^* \leftarrow \arg\min_c \left( Var\left( \sum_{i=0}^n c_i T_i - f_{mod(t)} \right) + \gamma|c|_2 \right) \quad \text{Equation 2}$$

In Equation 2, when $t \in I_i$, $f_{mod(t)}=t-i$ may be defined. In addition, in $I_i=[i-\epsilon, i+\epsilon]$, f mod: $\cup_{i=-K+1}^{K-1} I_i \rightarrow [-\epsilon, \epsilon]$. Herein, i denotes an integer that satisfies $|i|<K$. $\epsilon$ denotes a ratio between a ciphertext modulus and a maximum coefficient of a message polynomial. In addition, $|m_i|/q \leq \epsilon$, with respect to $m_i$ that indicates a coefficient of m(X).

In operation 215, the processor 200 may obtain a value $v_{aprx}$ using a polynomial generated based on the coefficient obtained in operation 213. The processor 200 may obtain $v_{aprx}$ using Equations 3 and 4 below, for example.

$$p_n(t) \leftarrow \sum_{i=0}^n c_i^* T_i \quad \text{Equation 3}$$

$$v_{aprx} \leftarrow Var(p_{n(t)} - f_{mod(t)}) \quad \text{Equation 4}$$

In operation 217, the processor 200 may experimentally obtain $V_{boot}$ by performing bootstrapping.

The processor 200 may adjust the weight-constant vector (for example, $\gamma$) corresponding to the coefficient that is based on the degree of the approximating polynomial, based on the variance and a predetermined reference variance (e.g., $V_{boot}$). When a difference between the reference variance and the variance is less than the variance, the processor 200 may decrease the weight-constant vector. When the difference between the reference variance and the variance is greater than or equal to the variance, the processor 200 may increase the weight-constant vector.

The processor 200 may use a binary search to adjust the weight-constant vector.

In operation 219, the processor 200 may compare a difference between $v_{boot}$ and a value obtained by multiplying $v_{aprx}$ by 2. In operation 221, when the difference is greater than or equal to δ, the processor 200 may determine whether a difference between $v_{boot}$ and $v_{aprx}$ is less than $v_{aprx}$.

In operation 223, when the difference between $v_{boot}$ and $v_{aprx}$ is greater than or equal to $v_{aprx}$, the processor 200 may increase the weight-constant vector. In operation 225, when the difference between $v_{boot}$ and $v_{aprx}$ is less than $v_{aprx}$, the processor 200 may decrease the weight-constant vector. When the weight-constant vector is adjusted, the processor 200 may perform again operation 213.

The processor 200 may determine, to be the approximating polynomial coefficient, a coefficient obtained when the variance of the error is less than a target variance. In operation 227, the processor 200 may determine whether the variance of the error is less than the target variance.

In operation 229, when the variance of the error is greater than or equal to the target variance, the processor 200 may increase n. In operation 231, when the variance of the error is less than the variance, the processor 200 may return a polynomial coefficient.

The processor 200 may perform bootstrapping by generating an approximating polynomial based on the returned coefficient.

The processor 200 may obtain the approximating polynomial coefficient using an integral equation corresponding to Equation 2 above. For example, the processor 200 may obtain the approximating polynomial coefficient using Equation 5 below, for example.

$$c^* \leftarrow \underset{c}{\mathrm{argmin}}\left(\int_{t \in dom[\cdot]_q} (p_n(t) - [t]_q)^2 dt + \gamma|c|_2\right) \quad \text{Equation 5}$$

The processor 200 may calculate the variance of the error based on a probability distribution corresponding to the ciphertext. For example, the processor 200 may obtain the approximating polynomial coefficient using Equation 6 below, for example, that uses a probability distribution of t in Equation 5.

$$c^* \leftarrow \underset{c}{\mathrm{argmin}}\left(\int_{t \in dom[\cdot]_q} Pr(T=t)(p_n(t) - [t]_q)^2 dt + \gamma|c|_2\right) \quad \text{Equation 6}$$

The processor 200 may use an LSM to perform an "argmin" operation.

FIG. 3 illustrates an example of an algorithm for calculating an approximating polynomial.

Referring to FIG. 3, the processor 200 may reduce a time used to homomorphically calculate an approximating polynomial using a characteristic of an odd function of the approximating polynomial. The processor 200 may reduce an approximation error and a basis error by excluding an even-degree term from the calculation.

In consideration that $f_{mod}(t)$ is an odd function, the processor 200 may reduce the calculation time used to calculate the approximating polynomial, using the characteristic of the odd function of the approximating polynomial that minimizes a variance.

Based only on a coefficient of an odd-degree term, the processor 200 may reduce a vector used for an operation using the approximating polynomial and a size of a matrix used for the operation to ½ and ¼, respectively.

The processor 200 may perform an approximating polynomial operation using a baby-step giant-step (BSGS) algorithm illustrated as an example in FIG. 3. Using a general BSGS algorithm, 35 non-scalar multiplications may be needed to perform a 255-degree polynomial operation. The processor 200 may reduce the number of the non-scalar multiplications to 30 using an odd BSGS algorithm that uses a characteristic of an odd function of an approximating polynomial.

The processor 200 may reduce the number of relinearlizations by applying a lazy relinearlization method to the odd BSGS algorithm. In the example of FIG. 3, the odd BSGS algorithm uses lazy rescaling and relinearlization.

A BSGS coefficient may be calculated in advance with respect to optimal parameters k and l that minimize the number of relinearlizations in $2^l \cdot k \geq \deg(p(t))$.

A basic block of the odd BSGS algorithm may be a baby polynomial of which a degree is less than k. The baby polynomial may be represented as $p_i^0(t) = \Sigma_{j \in \{1, 3, \ldots, k-1\}} d_{i,j} T_j(t)$ with respect to $i = 0, 1, 2, \ldots, 2^l - 1$. For example, when l=2, the baby polynomial in $p_i^1(t) = p_{2i}^0(t) + p_{2i+1}^0(t) \cdot T_k(t)$ may be represented by Equation 7 below, for example.

$$p(t) = p_0^2(t) = p_0^1(t) + p_1^1(t) \cdot T_{2k}(t) \quad \text{Equation 7:}$$

A coefficient of $p_i^0(t)$ may amplify a basis error, and thus a basis error with the degree being less than or equal to k may be important.

Figure 4:
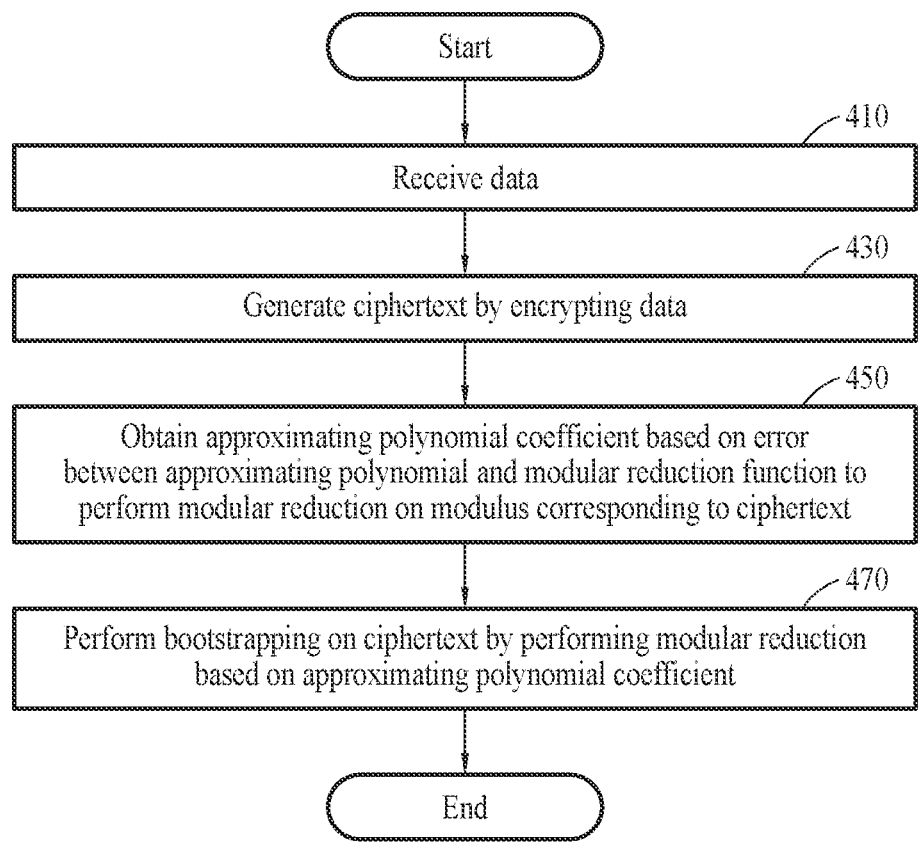
FIG. 4 illustrates an example of a flow of operations performed by an encryption apparatus.

FIG. 4 illustrates an example of a flow of operations performed by an encryption apparatus (e.g., the encryption apparatus 10 of FIG. 1).

Referring to FIG. 4, in operation 410, the receiver 100 may receive data. The processor 200 may perform encryption using homomorphic encryption. The processor 200 may perform bootstrapping by approximating a function corresponding to a modular reduction. The processor 200 may generate an approximating polynomial that approximates the function corresponding to the modular reduction. A basis of the approximating polynomial may include a basis of a Chebyshev polynomial or a constant multiple of the basis of the Chebyshev polynomial.

In operation 430, the processor 200 may generate a ciphertext by encrypting the data. In operation 450, the processor 200 may obtain an approximating polynomial coefficient based on an error between the approximating polynomial for performing the modular reduction on a modulus corresponding to the ciphertext and the modular reduction function.

The processor 200 may calculate the error between the approximating polynomial and the modular reduction function. The processor 200 may obtain the approximating polynomial coefficient based on a variance of the error.

The processor 200 may determine, to the approximating polynomial coefficient, a coefficient obtained when the variance of the error is less than a target variance.

The processor 200 may obtain the approximating polynomial coefficient based on the variance, a coefficient that is based on a degree of the approximating polynomial, and a weight-constant vector corresponding to the coefficient. The processor 200 may multiply the weight-constant vector and a squared L2-norm of the coefficient. The processor 200 may obtain, as the approximating polynomial coefficient, a coefficient that minimizes a value obtained by adding a result of the multiplying and the variance.

The processor 200 may adjust the weight-constant vector corresponding to the coefficient that is based on the degree of the approximating polynomial, based on the variance and a predetermined reference variance. When a difference between the reference variance and the variance is less than the variance, the processor 200 may decrease the weight-constant vector. When the difference between the reference variance and the variance is greater than or equal to the variance, the processor 200 may increase the weight-constant vector.

The processor 200 may calculate the variance of the error based on a probability distribution corresponding to the ciphertext. In operation 470, the processor 200 may perform bootstrapping on the ciphertext by performing the modular reduction based on the approximating polynomial coefficient.

The encryption apparatuses, receivers, processors, memories, encryption apparatus 10, receiver 100, processor 200, memory 300, and other apparatuses, devices, units, modules, and components described herein with respect to FIGS. 1-4 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented encryption method using homomorphic encryption, comprising:
    receiving data;
    generating a ciphertext by encrypting the received data;
    determining a coefficient of an approximating polynomial for performing a modular reduction on a modulus corresponding to the ciphertext, by minimizing a value determined based on a variance of an error between the approximating polynomial and a modular reduction function; and
    performing bootstrapping on the ciphertext by performing the modular reduction based on the determined coefficient of the approximating polynomial,
    wherein the determining of the coefficient of the approximating polynomial comprises:
        multiplying a weight-constant vector and a squared L2-norm of a coefficient that is based on a degree of the approximating polynomial; and
        determining, as the coefficient of the approximating polynomial, a coefficient that minimizes a value determined by adding a result of the multiplying and the variance.

2. The method of claim 1, wherein the determining of the coefficient of the approximating polynomial comprises:
    calculating the error between the approximating polynomial and the modular reduction function; and
    determining the coefficient of the approximating polynomial based on the variance of the error.

3. The method of claim 2, wherein the determining of the coefficient of the approximating polynomial based on the variance of the error comprises:
    determining, to be the coefficient of the approximating polynomial, a coefficient determined when the variance of the error is less than a target variance.

4. The method of claim 1, wherein a basis of the approximating polynomial comprises a basis of a Chebyshev polynomial or a constant multiple of the basis of the Chebyshev polynomial.

5. The method of claim 2, wherein the determining of the coefficient of the approximating polynomial further comprises:
    adjusting a weight-constant vector corresponding to a coefficient that is based on a degree of the approximating polynomial based on the variance and a predetermined reference variance.

6. The method of claim 5, wherein the adjusting of the weight-constant vector comprises:
    decreasing the weight-constant vector, in response to a difference between the reference variance and the variance being less than the variance; and
    increasing the weight-constant vector, in response to the difference between the reference variance and the variance being greater than or equal to the variance.

7. The method of claim 2, wherein the determining of the coefficient of the approximating polynomial based on the variance of the error comprises:
    calculating the variance of the error based on a probability distribution corresponding to the ciphertext.

8. A non-transitory computer-readable storage medium storing instructions that, when executed by a processor, configure the processor to perform the method of claim 1.

9. An encryption apparatus using homomorphic encryption, comprising:
    a receiver configured to receive data; and
    a processor configured to:
        generate a ciphertext by encrypting the received data;
        determine a coefficient of an approximating polynomial for performing a modular reduction on a modulus corresponding to the ciphertext, by minimizing a value determined based on a variance of an error between the approximating polynomial and a modular reduction function; and
        perform bootstrapping on the ciphertext by performing the modular reduction based on the determined coefficient of the approximating polynomial,
    wherein, for the determining of the coefficient of the approximating polynomial, the processor is configured to:
        multiply a weight-constant vector and a squared L2-norm of a coefficient that is based on a degree of the approximating polynomial; and
        determine, as the coefficient of the approximating polynomial, a coefficient that minimizes a value determined by adding a result of the multiplying and the variance.

10. The apparatus of claim 9, wherein, for the determining of the coefficient of the approximating polynomial, the processor is configured to:
    calculate the error between the approximating polynomial and the modular reduction function; and
    determine the coefficient of the approximating polynomial based on the variance of the error.

11. The apparatus of claim 10, wherein, for the determining of the coefficient of the approximating polynomial, the processor is configured to:
    determine, to be the coefficient of the approximating polynomial, a coefficient determined when the variance of the error is less than a target variance.

12. The apparatus of claim 9, wherein a basis of the approximating polynomial comprises a basis of a Chebyshev polynomial or a constant multiple of the basis of the Chebyshev polynomial.

13. The apparatus of claim 10, wherein, for the determining of the coefficient of the approximating polynomial, the processor is configured to:

adjust a weight-constant vector corresponding to a coefficient that is based on a degree of the approximating polynomial, based on the variance and a predetermined reference variance.

14. The apparatus of claim 13, wherein, for the adjusting of the weight-constant vector, the processor is configured to:
decrease the weight-constant vector, in response to a difference between the reference variance and the variance being less than the variance; and
increase the weight-constant vector, in response to the difference being greater than or equal to the variance.

15. The apparatus of claim 10, wherein, for the determining of the coefficient of the approximating polynomial, the processor is configured to:
calculate the variance of the error based on a probability distribution corresponding to the ciphertext.

16. A processor-implemented encryption method using homomorphic encryption, comprising:
generating a ciphertext by encrypting data;
determining, as a coefficient of an approximating polynomial, a coefficient that minimizes a value determined based on a variance of an error between the approximating polynomial and a modular reduction function; and
performing bootstrapping on the ciphertext by performing a modular reduction on a modulus corresponding to the ciphertext, based on the determined coefficient,
wherein the determined value is determined based on the variance, a weight-constant vector corresponding to the coefficient, and a squared L2-norm of the coefficient.

17. The method of claim 16, wherein the determining of the coefficient comprises adjusting a weight-constant vector corresponding to the coefficient, in response to a difference between a reference variance and a value determined based on the variance of the error being greater than or equal to a stop criterion.

18. The method of claim 17, wherein the reference variance is experimentally obtained by performing bootstrapping.

* * * * *